United States Patent
Yamasaki et al.

[11] Patent Number: 5,707,514
[45] Date of Patent: Jan. 13, 1998

[54] WATER TREATING METHOD AND APPARATUS TREATING WASTE WATER BY USING ION EXCHANGE RESIN

[75] Inventors: Kazuyuki Yamasaki, Hiroshima; Yoshihiro Hamaguchi, Kurashiki; Shigeki Matumoto, Fukuyama, all of Japan

[73] Assignee: Sharp Kabushiki Kaisha, Osaka, Japan

[21] Appl. No.: 659,285

[22] Filed: Jun. 6, 1996

[30] Foreign Application Priority Data

Aug. 16, 1995 [JP] Japan .................. 7-208737

[51] Int. Cl.$^6$ .................. C02F 1/42; B01D 24/28
[52] U.S. Cl. .................. 210/151; 210/189; 210/259; 210/264; 210/266; 210/268; 210/269; 210/274; 210/900; 210/617; 210/631; 210/650; 210/665; 210/669; 210/676; 210/677
[58] Field of Search .................. 210/675, 676, 210/677, 269, 900, 189, 190, 669, 259, 266, 264, 268, 274, 631, 638, 639, 650, 617, 665, 150, 151

[56] References Cited

U.S. PATENT DOCUMENTS

| | | | |
|---|---|---|---|
| 2,767,140 | 10/1956 | Fitch | 210/676 |
| 2,963,431 | 12/1960 | Dorn et al. | 210/676 |
| 3,193,498 | 7/1965 | Platzer et al. | 210/676 |
| 4,060,447 | 11/1977 | Nelson | 156/642 |
| 4,289,626 | 9/1981 | Knopp et al. | 210/669 |
| 4,808,316 | 2/1989 | Otomura et al. | 210/677 |
| 4,861,490 | 8/1989 | Morris | 210/677 |
| 5,066,371 | 11/1991 | DeVoe et al. | 210/688 |
| 5,084,185 | 1/1992 | Solt et al. | 210/677 |
| 5,112,504 | 5/1992 | Johnson | 210/268 |
| 5,116,511 | 5/1992 | Green et al. | 210/677 |
| 5,174,901 | 12/1992 | Smith | 210/652 |
| 5,302,288 | 4/1994 | Meidl et al. | 210/616 |
| 5,443,740 | 8/1995 | Schmitt | 210/900 |
| 5,580,445 | 12/1996 | Iwatsuka et al. | 210/266 |

FOREIGN PATENT DOCUMENTS

| | | |
|---|---|---|
| 0585036 A1 | 8/1993 | European Pat. Off. . |
| 1517930 | 7/1970 | Germany . |
| 3046361 A1 | 8/1981 | Germany . |
| 3903343 A1 | 8/1990 | Germany . |
| 4241080 C1 | 12/1992 | Germany . |
| 63-62582 | 3/1988 | Japan . |

OTHER PUBLICATIONS

Patent Abstracts Of Japan, vol. 94, No. 010, & JP 06 277663 A (Kurita Water Ind Ltd), 4 Oct. 1994.

Primary Examiner—Cynthia L. Nessler
Attorney, Agent, or Firm—Nixon & Vanderhye P.C.

[57] ABSTRACT

A water treating apparatus is provided which can treat waste water for use as raw water in an ultrapure water producing system without addition of various kinds of chemicals. The apparatus includes a first water tank for receiving acid waste water, a second water tank for subjecting the waste water from the first water tank to solid-liquid separation and discharging supernatant liquid, an ion exchange tank including ion exchange resin and an aeration tube for generating treated water through a membrane filter, a precipitation tank for settling ion exchange resin, an air lift pump for introducing ion exchange resin from the precipitation tank into the first water tank, and a return air lift pump for returning ion exchange resin from the second water tank to the ion exchange tank. The ion exchange resin acts to exchange ions with fluorine ions of treated water in the ion exchange tank and is regenerated by acid waste water in the first water tank.

8 Claims, 5 Drawing Sheets

WATER TREATING METHOD AND APPARATUS TREATING WASTE WATER BY USING ION EXCHANGE RESIN

BACKGROUND OF THE INVENTION

1. Field of the Invention

The present invention relates to a method and apparatus for water treatment and, more particularly, to a water treating method and apparatus which make it possible to utilize used ion exchange resin by regenerating the same with acid waste water or alkali waste water from a semiconductor plant, and which enables effective use of resources.

2. Description of the Prior Art

Conventionally, acid waste water from semiconductor plants is treated by using various kinds of chemicals. Treated water resulting from such treatment has been discharged without being recycled. The reason why such treated water has not been recycled is that electric conductivity of the treated water is so high as to defy recycling.

Hitherto, used ion exchange resins from most ultrapure water production systems have not been recycled but simply discarded as industrial waste.

The prior art will be discussed in further detail.

Among various types of waste water produced at a semiconductor plant, largest in quantity is acid waste water. Such acid waste water contains used acids, such as fluoric acid, sulfuric acid, and nitric acid, because such acids are used in large quantities at semiconductor plants. Hitherto, treatment of acid waste water has been carried out in such a way that substances, such as $F^-$ and $SO_4^{2-}$, contained in the acid waste water are chemically treated by subjecting them to coagulating sedimentation using various kinds of chemicals, such as slaked lime, caustic soda, sulfuric acid, polyaluminum chloride, and polymer coaqulants, in large quantities. Therefore, treated water, as obtained from such acid waste water, has comparatively high electric conductivity, say, on the order of from 1400 to 1900 μs/cm. Considering the fact that the electric conductivity of general city water or industrial water is of the order of 100–400 μs/cm, it may be readily understood that the electric conductivity of treated water from such acid waste water is extremely high. The term "city water" means potable water or tap water.

In this way, due to such large quantity use of slaked lime, polyaluminum chloride, and polymer coagulants for treatment of acid waste water, the treated water has high electric conductivity and a substantially high content of dissolved salts, and contains a greater total of cationic ions or anionic ions. As a result, the treated water is of such quality as will defy recycling.

Further, when the treated water is supplied to the ultrapure water production system, the coagulants adhere to the surface of ion exchange resin to deteriorate its ability, or clog a reverse osmosis (RO) membrane, because the treated water contains the coagulants. As a result, the treated water cannot be recycled.

Generally, at semiconductor plants, fluorine-containing acid waste water often has a fluorine concentration of the order of 30–300 ppm. Conventionally, in the case of fluorine-containing waste water of such a concentration, fine flocs of calcium fluoride and aluminum fluoride are produced by adding chemicals such as slaked lime and polyaluminum chloride to the waste water. Then, larger flocs are produced by adding a polymer coagulant, and thereafter the flocs are precipitated for separation. In such a way, the fluorine in the waste water has been treated. Since chemicals are used as mentioned above, the electric conductivity of the treated water is comparatively high on the order of 1400–1900 μs/cm.

FIG. 4 shows a conventional water utilization system in a semiconductor plant which includes a facility for treating waste water through two-step coagulating sedimentation. As shown, the acid waste water from the semiconductor plant 100 first flows into a raw water tank 101 in which some adjustment is made with respect to the volume and quality of the waste water. Thereafter, the acid waste water is transferred to a first reaction tank 102 by a raw water pump 112.

Then, the waste water is subjected to reaction through agitation by an agitator 113 in the first reaction tank 102 to which slaked lime has been added. Then, in the first reaction tank 102, the fluorine reacts with calcium to produce calcium fluoride. Thus, fluorine is removed from the waste water. Then, the waste water is transferred to a second reaction tank 103 loaded with an aluminum agent in which the waste water is subjected to reaction through agitation. In this second reaction tank 103, unreacted fluorine in the waste water reacts with the aluminum agent to produce aluminum fluoride. Thus, further fluorine is removed from the waste water.

Next, the waste water is transferred to a first coagulation tank 104 and is loaded with a polymer coagulant. Thereupon, fine flocs of calcium fluoride produced through the reaction in the first reaction tank 102 and fine flocs of aluminum fluoride produced through the reaction in the second reaction tank 103 are coagulated into larger flocs. Then, the waste water is introduced into a first precipitation tank 105 in which the waste water is subjected to solid-liquid separation.

With the above described steps alone, the fluorine concentration of the waste water cannot be reduced to a target water quality level of not more than 15 ppm. Therefore, the waste water is then transferred sequentially to a third reaction tank 106, a second coagulation tank 107, and a second precipitation tank 108, and thereafter the waste water is further passed through a pH adjusting tank 109 so that the pH of the waste water may come within the limits of the discharge standards. Thus, the waste water is discharged only after its pH has been adjusted. The precipitations of the first and second precipitation tanks 105 and 108 are respectively collected by scrapers 114 and transferred to a concentration tank 110. The precipitation of the concentration tank 110 is collected by a scraper 114 and transferred to a filter press 111 to be hydrated.

Meanwhile, a neutral waste water of comparatively good quality such as pure water used only for washing purposes at the semiconductor plant is recycled as it is. That is, the neutral waste water is introduced into an ultrapure water production apparatus 115, and after undergoing various treatments in the ultrapure water production apparatus 115, the neutral waste water is returned to the semiconductor plant for use as ultrapure water. As FIG. 4 shows, in addition to neutral waste water from an industrial plant, city water or industrial water is introduced into the ultrapure water production apparatus 115 for mixture with the neutral waste water. In this way, ultrapure water is produced for utilization. As already stated, however, acid waste water has not generally been recycled.

A few semiconductor plants exist in Japan which are equipped with a complete closed system capable of recycling acid waste water. In plant facilities with such a complete closed system, it is common practice that after dilute acid waste water is passed through an activated carbon filter for treatment of organic matter and/or hydrogen peroxide, the waste water is passed through weak anion exchange resin and cation exchange resin and is further subjected to UV (ultraviolet) germicidal and other treatments for microorganism disinfection.

Another water treating method in which acid waste water can be reused is described in Japanese Patent Laid-Open Publication No. 63-62592. This method is such that after waste water is passed through an activated carbon filter, the waste water is treated in a mixed bed tower of strong acid cation exchange resin and weak basic anion exchange resin. Through this treatment the waste water is converted into ultrapure water for reutilization.

In both of aforesaid two water treating methods are used ion exchange resins. The methods, therefore, have a disadvantage that the ion exchange resin require regeneration and, when the ion exchange resin is deteriorated in its performance, it must be replaced and discarded.

Further, with the two water treating methods, the current practice is that strong acid waste water is not allowed to join with any comparatively dilute acid waste water to be recycled, but is separately stored in a tank for collection by an independent firm.

Therefore, a need exists for an apparatus and method for waste water treatment which enables reutilization of an acid waste water having a strong acid waste water content.

Referring now to FIG. 5, operation of a cation exchange resin tower 125 as an example of an ion exchange apparatus of the type which is employed in aforesaid two water treating methods will be explained. The cation exchange resin tower 125 is loaded with a predetermined amount of cation exchange resin. The water to be treated is allowed to flow a given amount at a time through a top inlet 125A of the cation exchange resin tower 125. In case that the electric conductivity of treated water as discharged from an outlet 125C of the cation exchange resin tower 125 should become unfavorable, several % hydrochloric acid or sulfuric acid is fed through a lower inlet 125B into the cation exchange resin tower 125 to regenerate the cation exchange resin. After regeneration of the cation rein, the regenerating waste water (hydrochloric acid or sulfuric acid) used is discharged from an outlet piping 125D at the top of the cation exchange resin tower 125.

Generally, the cation exchange resin tower 125 which constitutes an ultrapure water production apparatus does not directly receive industrial water or city water but allows such water to flow into the tower 125 only after the water is subjected to pretreatment in a pretreating apparatus H1 as shown in FIG. 5. For such pretreatment, methods such as coagulating sedimentation, coagulating filtration, activated carbon adsorption, and reverse osmosis membrane treatment may be employed alone or in combination.

In this way, pretreated water generated by causing industrial water or city water to undergo quality improving treatment is introduced into the cation exchange resin tower 125 or ultrapure water production apparatus. Therefore, the cation exchange resin tower 125 is employed in a comparatively favorable water quality condition. In other words, water of comparatively good quality or water pretreated to such quality level is supplied into the cation exchange resin tower 125. Therefore, usual practice has been that immediately when the quality of water discharged from the outlet of the cation exchange resin tower 125 becomes unfavorable, the cation exchange resin is regenerated, or if regeneration does not result in water quality improvement, the cation exchange resin is judged to be unsuitable for use with the ultrapure water production apparatus and is totally replaced at a cost involved for the purpose.

With no exception, semiconductor plants are equipped with a large scale ion exchange resin unit as shown in FIG. 5. The ultrapure water production unit has a large amount of cation exchange resin placed therein. When the ion exchange performance of the cation exchange resin itself is deteriorated, the resin is usually disposed of as industrial waste irrespective of costs involved therefor. The reason is that if the cation exchange resin is deteriorated in performance, not only does water yield decrease, but there occurs the problem of organic matter eluation from the cation exchange resin. However, this does not mean that the resin has totally lost its ion exchange capability, but means that the resin has been deteriorated in its ion exchange performance.

Even then, however, it has been usual practice that cation exchange resin, when its performance is deteriorated, is not reutilized, but discarded as industrial waste at the expense of necessary disposal cost. Used ion exchange resin as industrial waste has in no case been reutilized in any recycling unit which is of lower level than aforesaid ultrapure water production unit in terms of water quality.

As already stated, acid waste water from a semiconductor plant is treated by using various chemical in large amounts and accordingly the electric conductivity of the treated water is high on the order of 1400–1900 μs/cm. As such, the treated water is unsuitable for use as raw water in an ultrapure water production unit.

At present, several semiconductor plants exist which employ a complete closed system. However, the truth is that while only dilute acid waste water is recycled by treating such waste water by ion exchange resin or the like, such an acid waste water mixture that dilute acid waste water and strong acid waste water are mixed together is in no case recycled.

Further, there has been no practice of recycling quality-deteriorated ion exchange resin that is discarded as industrial waste from an ultrapure water production unit.

Where ion exchange resin is used in the cation exchange resin tower 125, used ion exchange resin must be chemically regenerated. With one resin tower 125 alone, therefore, it is not possible to carry out continuous operation. Further, for the purpose of regenerating ion exchange resin, a particular chemical (regeneration liquor) is separately needed. In this conjunction, it is also necessary to carry out neutralization treatment after the ion exchange resin is passed through the regeneration liquor. This poses the problem of running cost for neutralization treatment.

SUMMARY OF THE INVENTION

Therefore, it is an object of the present invention to provide a water treating method and apparatus which can treat such a waste water mixture of strong acid waste water and dilute acid waste water (or of strong alkali waste water and dilute alkali waste water) as has not been recycled in the past, to provide treated water that may be used as raw water for an ultrapure water production system without addition of various kinds of chemicals.

It is another object of the invention to provide a waste water treating method and apparatus which make it possible to effectively recycle used ion exchange resins which have conventionally been discarded as industrial waste.

In order to accomplish these objects, according to the invention, there is provided a water treating method comprising the steps of:

introducing alkali water or acid water into a first water tank;

introducing anionic water or cationic water into an ion exchange tank for subjecting the anionic water or cationic water to an ion exchange treatment with anion exchange resin or cation exchange resin to thereby obtain treated water;

introducing the anion exchange resin or cation exchange resin in the ion exchange tank into the first water tank to regenerate the anion exchange resin or cation exchange resin with the alkali water or acid water; and returning the anion exchange resin or cation exchange resin regenerated in the first water tank to the ion exchange tank;

said anion exchange resin or cation exchange resin being circulated between the ion exchange tank and the first water tank.

Therefore, according to the present invention, the anionic water or cationic water introduced into the ion exchange tank is subjected to ion exchange with the anion exchange resin or cation exchange resin in the ion exchange tank. After this ion exchange treatment, the anion exchange resin or cation exchange resin, that is, ion exchange resin is introduced into the first water tank. The anion exchange resin or cation exchange resin introduced into the first water tank is regenerated with alkali water or acid water in the first water tank. The regenerated anion exchange resin or cation exchange resin is returned to the ion exchange tank.

In this way, according to the invention, the ion exchange resin used for ion exchange in the ion exchange tank is regenerated by the alkali water or acid water in the first water tank. Further, in this regeneration process, the alkali water or acid water is brought close to neutrality by virtue of the ion exchange resin. In other words, according to the invention, by repeating the process of using the ion exchange resin in the ion exchange tank and regenerating used ion exchange resin in the first water tank, it is possible to use the ion exchange resin advantageously for water treating purposes in both the first water tank and the ion exchange tank. Therefore, the invention permits most effective use of ion exchange resins for water treatment. Further, used ion exchange resins need not be discarded as waste, and this results in good saving in the cost of waste disposal. Thus, the invention provides a water treating method which involves less waste, permits effective resource utilization, and requires less running cost.

According to the invention, treated water is obtained through ion exchange treatment of waste water with ion exchange resin in the ion exchange tank. The treated water from the ion exchange tank has a substantially lower electric conductivity because of the ion exchange effected in that tank, and can be used as raw water for supply to an ultrapure water production system. This results in effective utilization of water.

According to an embodiment of the invention, the alkali water or acid water introduced into the first water tank is an alkali waste water or acid waste water to be treated, and the alkali waste water or acid waste water which has been subjected to a predetermined treatment after regenerating the anion exchange resin or cation exchange resin in the first water tank is introduced into the ion exchange tank as water to be treated.

According to this embodiment, the alkali waste water or acid waste water in the first water tank can be effectively utilized for regeneration of the ion exchange resin and, at the same time, can be brought close to neutrality through utilization of the ion exchange resin. This means that regeneration and treatment can be simultaneously carried out in one stage, which in turn means efficient water treatment.

According to the above embodiment, the anionic water or cationic water produced in the process of treating alkali waste water or acid waste water is subjected to ion exchange in the ion exchange tank, it being thus possible to obtain a treated water useful as raw water for supply to an ultrapure water production system. This provides for good improvement in waste water reutilization efficiency.

According to an embodiment of the invention, there is provided a water treating apparatus comprising:

a first water tank for receiving alkali water or acid water;

an ion exchange tank having anion exchange resin or cation exchange resin into which anionic water or cationic water is introduced such that the anionic water or cationic water is subjected to an ion exchange treatment with the anion exchange resin or cation exchange resin for generation of treated water;

an ion exchange resin introduction means for introducing into the first water tank the anion exchange resin or cation exchange resin in the ion exchange tank;

an ion exchange resin return means for returning to the ion exchange tank the anion exchange resin or cation exchange resin regenerated by alkali water or acid water in the first water tank; and means for receiving alkali water or acid water from the first water tank in which the anion exchange resin or cation exchange resin has been regenerated and for introducing into the ion exchange tank water to be treated which is the alkali water or acid water having been subjected to a predetermined treatment.

According to this embodiment, the anionic water or cationic water introduced into the ion exchange tank is subjected to ion exchange with anion exchange resin or cation exchange resin in the ion exchange tank. After this ion exchange treatment, the ion exchange resin is introduced into the first water tank by the ion exchange resin introduction means. The anion exchange resin or cation exchange resin introduced into the first water tank is regenerated with the alkali waste water or acid waste water in the first water tank. The regenerated anion exchange resin or cation exchange resin is returned to the ion exchange tank through the ion exchange resin return means.

In this way, according to this embodiment, the ion exchange resin used for ion exchange in the ion exchange tank is regenerated with alkali water or acid water in the first water tank. Further, in this regeneration process, the alkali water or acid water is brought close to neutrality by the action of the ion exchange resin. In other words, by repeating the process of using the ion exchange resin in the ion exchange tank and regenerating used ion exchange resin in the first water tank, it is possible to use the ion exchange resin advantageously for water treating purposes in both the first water tank and the ion exchange tank. Therefore, the embodiment permits most effective use of ion exchange resins for water treatment. Further, used ion exchange resins need not be discarded as waste, and this results in good saving in the cost of waste disposal. Thus, the embodiment provides a water treating apparatus which enables reduced waste generation, permits effective resource utilization, and requires less running cost.

According to the embodiment, treated water is obtained through ion exchange treatment of waste water with ion exchange resin in the ion exchange tank. The treated water from the ion exchange tank has a substantially lower electric conductivity because of the ion exchange effected in that tank, and can be used as raw water for supply to an ultrapure water production system. This results in effective utilization of water.

In the apparatus of the embodiment, after regeneration of used ion exchange resin in the first tank, the alkali water or acid water undergoes a predetermined treatment, and the resulting treated water is introduced into the ion exchange tank for ion exchange. This enables supply of a treated water suitable for use as raw water in an ultrapure water production system. Thus, according to the embodiment, after the alkali water or acid water is subjected to a predetermined treatment, the water is caused to undergo the process of ion exchange, whereby the water can be turned into raw water for use with the ultrapure water production system. This provides for improvement in waste water recycling efficiency.

According to an embodiment, the first water tank receives alkali waste water or acid waste water as alkali water or acid water.

According to the embodiment, it is possible to carry out the step of regenerating the ion exchange resin in the first water tank and the step of bringing the alkali waste water or acid waste water to a neutral water level in one treating operation, which results in improved water treating efficiency.

A water treating apparatus of an embodiment comprises aeration means for mixing the alkali water or acid water with anion exchange resin or cation exchange resin in the first water tank.

According to this embodiment, it is possible to mix the ion exchange resin with the alkali water or acid water without damaging the ion exchange resin, thereby to facilitate regeneration of the ion exchange resin.

A water treating apparatus of an embodiment comprises aeration means for mixing the anionic water or cationic water with anion exchange resin or cation exchange resin in the ion exchange tank.

According to this embodiment, it is possible to mix the ion exchange resin with anionic water or cationic water without causing any damage and/or wear to the ion exchange resin, thereby to facilitate ion exchange treatment of the anionic water or cationic water with the ion exchange resin.

According to an embodiment, the ion exchange resin introduction means and the ion exchange resin return means each comprise piping interconnecting the first water tank and the ion exchange tank and an air lift pump.

According to this embodiment, it is possible to enable the ion exchange resin to be efficiently transported from the ion exchange tank to the first water tank or from the first water tank to the ion exchange tank without causing any damage and/or wear to the ion exchange resin.

According to an embodiment, the ion exchange tank includes a membrane filter placed therein and there is provided a treated water discharge means for discharging a treated water from which the anion exchange resin or cation exchange resin has been separated through the membrane filter.

According to the embodiment, the treated water from which the ion exchange resin has been separated by the treated water discharge means can be used for supply as raw water to the ultrapure water production system.

According to an embodiment, the means for introducing into the ion exchange tank the water to be treated which has been subjected to the predetermined treatment include a calcium carbonate mineral tank having a calcium carbonate mineral placed therein which receives from the first water tank an acid waste water having regenerated the cation exchange resin in the first water tank and which discharges a liquid resulting from the calcium carbonate mineral dissolved in the acid waste water to have a liquid level close to neutrality.

According to this embodiment, when the acid waste water is treated with the calcium carbonate mineral, calcium ions elute into the acid water of low pH value so that the treated water contains calcium ions. The calcium ions contained in the treated water are attached to the cation exchange resin in the ion exchange tank. That is, the cation exchange resin acts to remove calcium ions from the treated water on an interchange mode. Used cation exchange resin which has been brought into bond with the calcium ions is introduced into the first water tank for regeneration therein.

In this way, according to the embodiment, the treated water obtained after the acid waste water is treated with the calcium carbonate mineral is cationic water that is to be introduced into the ion exchange tank. Therefore, according to the embodiment, the acid waste water will first react with the cation exchange resin in the first water tank to regenerate the cation exchange resin. In this case, the pH of the acid waste water is increased so that the pH is brought close to a neutral water level. Then, the acid waste water brought close to neutrality reacts with the calcium carbonate mineral so that the water gets closer to neutrality. As the pH value further increases, the acid waste water that contains calcium ions is rendered electrically less conductive in the ion exchange tank in which the calcium ions are removed. Thus, treated water that is usable as raw water for the ultrapure water production system can be obtained.

According to the embodiment, the quantity of reaction precipitates may be held to a minimum level, because the neutralization reaction of the acid waste water due to the elution of the calcium carbonate mineral is a slow reaction which may be taken as a chemico-theoretically equivalent reaction. Therefore, the quantity of waste is minimized.

According to an embodiment, the means for introducing into the ion exchange tank the water to be treated which has been subjected to the predetermined treatment include a biological treating tank for receiving the liquid brought close to neutrality from the calcium carbonate mineral tank, said biological treating tank having charcoal and plastic filler placed therein by which the liquid is circulated for biological treatment, and for discharging biologically treated liquid as cationic water to the ion exchange tank.

According to this embodiment, it is possible to treat the organic matter contained in the liquid by the action of microorganisms grown on the plastic filler and charcoal. Also, with the presence of the plastic fillers, it is possible to improve the efficiency of liquid contact within the tank.

Further, by utilizing the charcoal as a catalyst in the biological treatment tank, it is possible to cause the hydrogen peroxide contained in the liquid to be decomposed into water and oxygen gas. At the same time, the organic matter in the liquid can be adsorbed in the charcoal.

Therefore, according to the embodiment, the electric conductivity of treated water can be reduced to the extent that the treated water may be used as raw water for ultrapure water production systems, in contrast to the prior art practice in which treatment of hydrogen peroxide is carried out by using chemicals such as $NaHSO_3$ and the like as reducers.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to various forms of arrangement illustrated in the accompanying drawings.

First Embodiment

Figure 1:
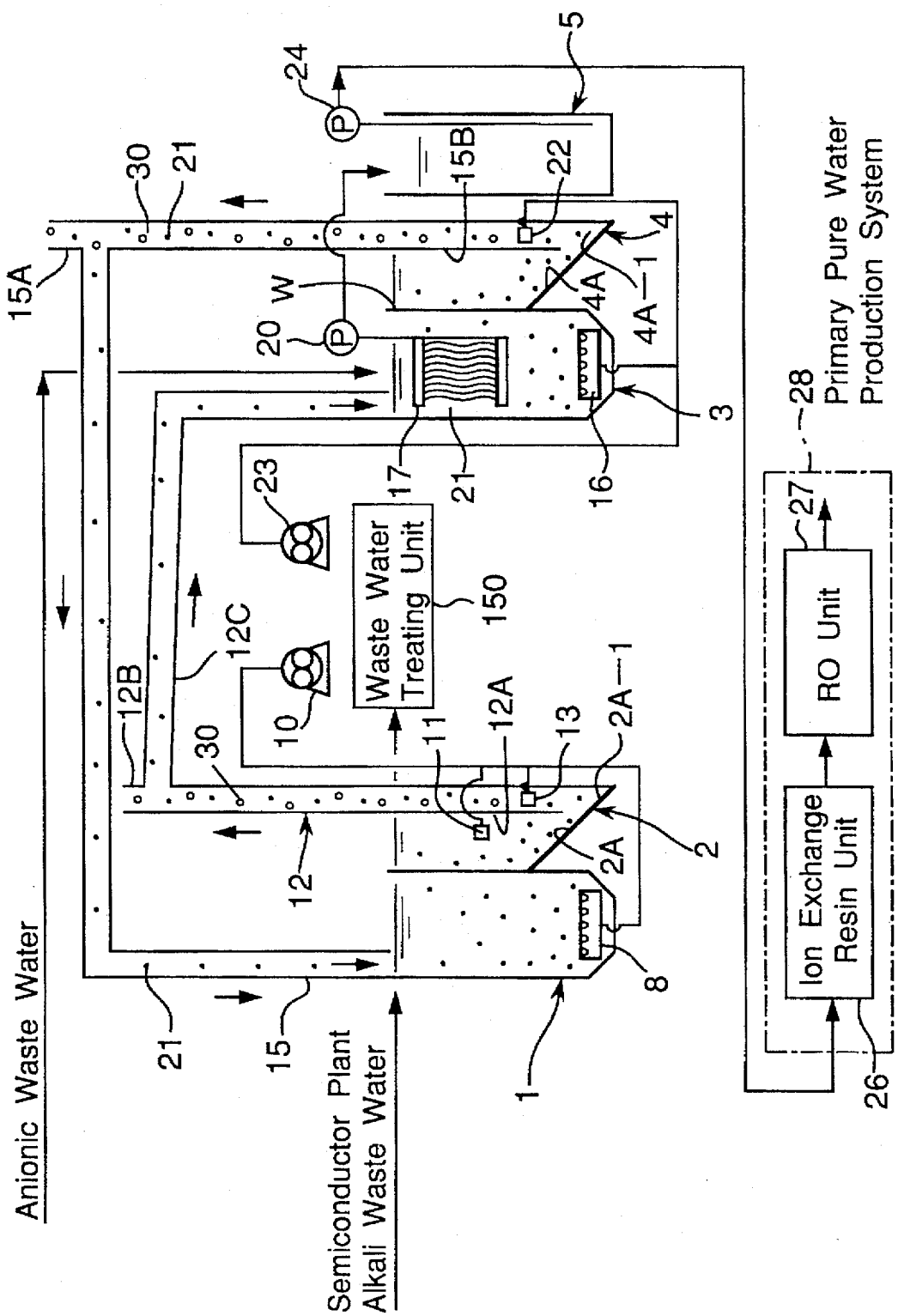
FIG. 1 is a diagram showing a first embodiment of a water treating apparatus in accordance with the present invention.

FIG. 1 shows a first embodiment of a water treating apparatus in accordance with the invention. In the first embodiment, the water treating apparatus comprises a first water tank 1, a second water tank 2, a third water tank 3, a fourth water tank 4, a fifth water tank 5, an ion exchange resin unit 26, and a reverse osmosis (RO) membrane unit 27.

The first water tank 1 has an aeration tube 8 as agitation means and receives alkali waste water (i.e. water containing regenerating chemicals) from a semiconductor plant. The aeration tube 8 is connected to a blower 10. An incoming air lift pump 15 is fixedly mounted at the top end of the first water tank 1. The first water tank 1 has a function of an anion exchange resin recycling/aeration tank as will be described hereinafter.

The second water tank 2 is provided adjacent to the first water tank 1. The second water tank 2 receives treated water from the first water tank 1. The second water tank 2 has an inclined bottom 2A. Also, the second water tank 2 has an aeration tube 11 as aeration/agitation means which is disposed about vertically midway therein. The aeration tube 11 is connected to the blower 10. Fixed within the second water tank 2 is an inlet end 12A of a return air lift pump 12, the inlet end 12A being open toward a lowermost portion of the bottom 2A. The inlet end 12A has an aeration tube 13 as air introduction means which is connected to the blower 10. Treated water from the second water tank 2 is introduced into a waste water treating unit 150 for further treatment.

The return air lift pump 12 extends upward from the second water tank 2 and has a top open end 12B which is open upward. The pump 12 has a lateral extension 12C which extends rightward from a location slightly below the top open end 12B as viewed in FIG. 1. The lateral extension 12C is slightly sloped downward from left to right as shown. The lateral extension 12C bends downward at a location above the third water tank 3 until it reaches the top end of the third water tank 3.

The incoming air lift pump 15 extends upward from the top end of the first water tank 1 and bends horizontally rightward at a level higher than the return air lift pump 12. The incoming air lift pump 15 further extends rightward in a slightly upgrade fashion, bending downwardly at a location above the fourth water tank 4 as shown. The downwardly bend portion has an upwardly extending portion defining an open end 15A which is open upward. A lower end portion 15B of the incoming air lift pump 15 is open toward a lowermost end 4A-1 of an inclined bottom 4A of the fourth water tank 4.

The third water tank 3 has an aeration tube 16 and is fed with anionic waste water which contains $F^-$ and $SO_4^{2-}$ as negative ions. The aeration tube 16 is connected to a blower 23. The third water tank 3 is fed with anion exchange resin 21 as ion exchange resin. The third water tank 3 is equipped with a membrane filter unit 17. The membrane filter unit 17 includes a plurality of laterally arranged ultrafilter membranes and/or precision filter membranes. Treated water that has passed through the membrane filter unit 17 is pumped up by a pump 20 and introduced into the fifth water tank 5.

Anionic waste water from the third water tank 3 that contains anion exchange resin 21 is introduced into the fourth water tank 4 through an outlet pipe (not shown) of a partition wall W. An aeration tube 22 which functions as air introduction means is disposed within the lower end portion 15B of the incoming air lift pump 15 which is open at the lowermost end 4A-1 of the fourth water tank 4. The aeration tube 22 is connected to the blower 23.

The treated water introduced from the third water tank 3 into the fifth water tank 5 is pumped up by a pump 24 into the ion exchange resin unit 26, and further into the reverse osmosis membrane unit 27. The ion exchange resin unit 26, in combination with the reverse osmosis membrane unit 27, constitutes a primary pure water production system 28.

In the water treating apparatus of the above described setup, alkali waste water is first introduced into the first water tank 1 which functions as an anionic resin recycling/aeration tank. The alkali waste water acts to regenerate the anionic resin introduced by the incoming air lift pump 15 into the first water tank 1. In other words, the alkali waste water expels the negative ions exchanged by the anion exchange resin 21 to restore the ion exchangeability of the anion exchange resin 21. The anion exchange resin 21 in the first water tank 1 which has thus restored its ion exchangeability is introduced into an adjacent tank, i.e., the second water tank (a first sedimentation tank) 2, in which the anion exchange resin 21 goes down and further moves downward along the inclined bottom 2A until it reaches the lowermost portion 2A-1. Particles of anion exchange resin 21 which have reached the lowermost portion 2A-1 are sucked through the inlet end 12A of the return air lift pump 12 for being moved upward together with air 30. The air 30 is discharged from the top open end 12B. Particles of the anion exchange resin 21 move downward along the lateral extension 12C and further continue to travel downward for return into the third water tank 3 from above. The anion exchange resin 21 thus sent back to the third water tank 3 acts to remove negative ions ($F^-$ and/or $SO_4^{2-}$) on an exchange basis from the anionic waste water which is under agitation by the aeration tube 16. The anionic waste water which has thus been made free from negative ions is passed through a membrane filter 19 and pumped up by a pump 20 for being introduced into the fifth water tank 5.

Particles of the used anion exchange resin 21 which are fed through the effluent pipe (not shown) of partition wall W of the third water tank 3 into the adjacent fourth water tank 4 are allowed to move downward along the inclined bottom 4A until they reach the lowermost end 4A-1. Then, the anion exchange resin 21 particles are sucked through the lower end portion 15B of the incoming air lift pump 15, being caused to move upward with air 30. The air 30 is discharged from the open end 15A. Particles of anion exchange resin 21 move leftward along a downward slope of the incoming air lift pump 15 and descend vertically from a location above the first water tank 1 until they reach the tank 1. Particles of anion exchange resin 21 which have reached the first water tank 1 are regenerated by alkaline waste water as earlier stated.

The anionic waste water which is introduced into the fifth water tank 5 is then supplied as water under treatment to the ion exchange resin unit 26 of the ultrapure water production system 28 and is subjected to further ion exchange treatment. The treated water is passed through the reverse osmosis membrane unit 27 and is then collected as primary pure water.

In this way, according to this first embodiment, $F^-$ and/or $SO_4^{2-}$ is removed from the anionic waste water by anion exchange resin 21 in the third water tank 3, and the used anion exchange resin 21 is introduced into the first water tank 1 by means of the air lift pump 15 so that the anion exchange resin 21 is regenerated with alkali waste water. The anion exchange resin 21 thus regenerated is returned by the return air lift pump 12 to the third water tank 3. In this first embodiment, therefore, the operation in the first water tank 1 for neutralization of the alkali waste water from the semiconductor plant also serves the purpose of regenerating the anion exchange resin 21. In other words, the arrangement makes it possible to simultaneously carry out the treatment of the alkali waste water and the regeneration of the anion exchange resin 21. According to the arrangement, therefore, it is possible to utilize a waste water mixture of strong alkali waste water and dilute alkali waste water as raw water for an ultrapure water production system 28 without addition of various kinds of chemicals.

Further, according to this first embodiment, the ion exchange resin already used in the ion exchange resin unit 26 is introduced into the third water tank 3 for reuse therein, and this provides for quantity reduction of industrial waste and, in addition, cost reduction in waste treatment.

In the first water tank 1, regeneration of the anion exchange resin 21 may result in that the waste water therein may contain anions from the anion exchange resin 21, but this involves no problem because the resulting anion concentration is low and because such anion content is removed in the subsequent process of waste water treatment. In this first embodiment, regeneration of anion exchange resin 21 is carried out with alkaline waste water, but it is needless to say that cation exchange resin regeneration may be carried out with acid waste water. This first embodiment takes advantage of the fact that acid waste water and/or alkali waste water from semiconductor plants has no much impurity content other than acid and alkali substances.

Second Embodiment

Figure 2:
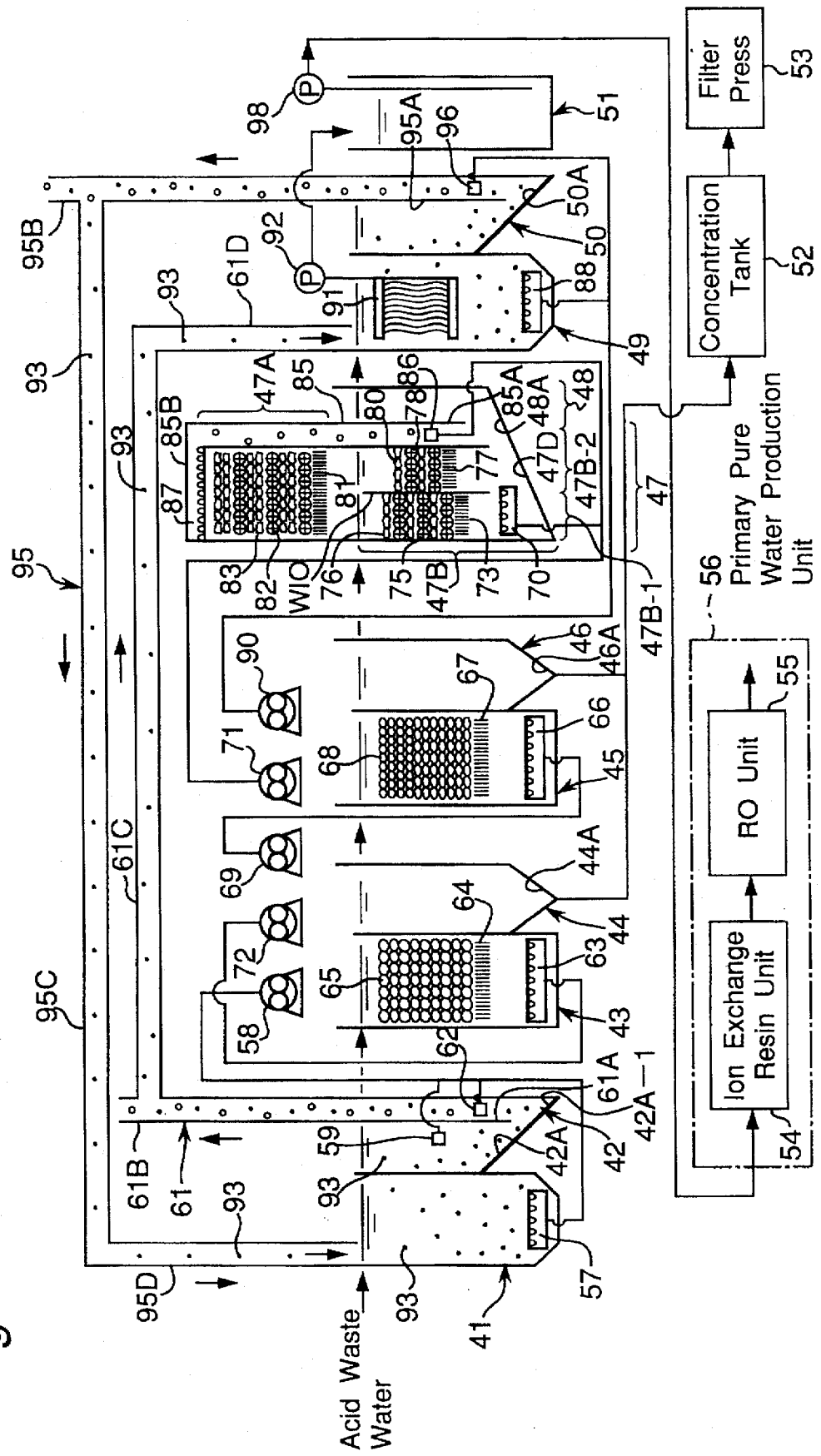
FIG. 2 is a diagram showing a second embodiment of a water treating apparatus according to the invention.

FIG. 2 shows a second embodiment of a water treating apparatus in accordance with the invention. This second embodiment is designed to treat acid waste water that is produced in large volume at a semiconductor plant, to a level suitable for utilization at an ultrapure water production facility. More particularly, the second embodiment is intended to recycle a mixture acid waste water from the semiconductor plant which consists of (1) acid waste water collected by the producer, (2) strong acid waste water, and (3) dilute acid waste water (hereinafter referred to as acid waste water) for use as raw water at the ultrapure water production facility. The second embodiment is an example in which the apparatus is capable of treating even such substances as $H_2O_2$ and organic matter. In the present second embodiment, a calcium carbonate mineral is used for treatment of acid waste water, which has been found effective for production of treated water of comparatively good quality.

As FIG. 2 shows, the apparatus of this second embodiment includes a first water tank 41, a second water tank 42, a third water tank 43, a fourth water tank 44, a fifth water tank 45, a sixth water tank 46, a seventh water tank 47, an eighth water tank 48, a ninth water tank 49, a tenth water tank 50, and an eleventh water tank 51. The apparatus also includes a concentration tank 52 and a filter press 53. Further, the apparatus includes a primary pure water production unit 56 having an ion exchange resin unit 54 and a reverse osmosis membrane unit 55.

The first water tank 41 is provided with an aeration tube 57 at the bottom thereof which is connected to a first blower 58. The first water tank 41 is adapted to receive supply of acid waste water from a semiconductor plant (not shown). The second water tank 42 is disposed adjacent to the first water tank 41. The second water tank 42 has an inclined bottom 42A. An aeration tube 59 as agitation means is disposed at a vertically median location in the second water tank 42. The aeration tube 59 is connected to the first blower 58. An inlet end 61A of an air lift pump 61 is fixedly mounted in the second water tank 42. The inlet end 61A is open toward a lowermost portion 42A-1 of the inclined bottom 42A of the second water tank 42. An aeration tube 62 which acts as air introduction means is disposed within the inlet end 61A. The aeration tube 62 is connected to the first blower 58.

The air lift pump 61 extends straightly upward from the inlet end 61A, and the topmost portion of the pump 61 defines an open end 61B which is open upward. The air lift pump 61 has a lateral portion 61C which extends laterally from a site located slightly before the open end 61B, the lateral portion 61C terminating at a site located above the ninth water tank 49. The lateral portion 61C is sloped slightly downward from the second water tank 42 and toward the ninth water tank 49. The air lift pump 61 extends downward from the end of the lateral portion 61C until it reaches the ninth water tank 49.

The third water tank 43 is disposed adjacent to the second water tank 42 in spaced relation thereto. The third water tank 43 is adapted to receive supply of water to be treated from the second water tank 42. An aeration tube 63 which acts as aeration/agitation means is disposed at the bottom of the third water tank 43. The aeration tube 63 is connected to a second blower 72. A lattice plate 64 is securely fixed in position above the aeration tube 63. Grains of calcium carbonate mineral 65 having a large grain size on the order of 10 mm are stacked in layers on the lattice plate 64. The fourth water tank 44 is disposed adjacent to the third water tank 43 and in abutting relation thereto. The fourth water tank 44 has a bottom of tapered conical shape, and the lowermost portion 44A of the tank 44 is connected to a concentration tank 52 through a piping.

The fifth water tank 45 is disposed adjacent to the fourth water tank 44 in spaced relation thereto. An aeration tube 66 is disposed at the bottom of the fifth water tank 45. The aeration tube 66 is connected to a third blower 69. A lattice plate 67 is securely fixed in position above the aeration tube 66. Grains of calcium carbonate mineral 68 having a smaller grain size on the order of 5 mm are stacked in layers on the lattice plate 67. The sixth water tank 46 is disposed adjacent to the fifth water tank 45 and in abutting relation thereto. The sixth water tank 46 has a bottom 46A of tapered conical shape of which a lowermost portion is connected to a concentration tank 52 through a piping.

The seventh water tank 47 is disposed adjacent to the sixth water tank 46 in spaced relation thereto. The seventh water tank 47 has a wetting upper portion 47A and a submerged lower portion 47B. The submerged lower portion 47B includes an aeration tube 70 disposed at a bottom portion, a first contact circulation portion 47B-1, and a second contact circulation portion 47B-2 located next thereto. The aeration tube 70 is connected to a fourth blower 71. The first contact circulation portion 47B-1 has alternately stacked layers of plastic fillers 75 and charcoal 76 on a lattice plate 77. The second contact circulation portion 47B-2 has alternately stacked layers of plastic fillers 78 and charcoal 80 on a lattice plate 77. The wetting upper portion 47A has a lattice plate 81 and layers of plastic fillers 82 and charcoal 80 stacked alternately on the lattice plate 81. The seventh water tank 47 includes an air lift pump 85 having a lower end opening 85A located adjacent to the lowermost portion of the second contact circulation portion 47B-2. The air lift pump 85 has an aeration tube 86 located within the lower end opening 85A, the aeration tube 86 acting as air introduction means. The air lift pump 85 extends upward from the lower end opening 85A, and bends laterally at a site above the wetting upper portion 47A, extending horizontally from that site to define a horizontally extending portion 85B. The portion 85B constitutes a sprinkler 87 and is formed at an underside portion thereof with a plurality of holes.

The eighth water tank 48 is disposed adjacent to and in continuation from the seventh water tank 47. The eighth water tank 48 is adapted to receive supply of water treated from the seventh water tank 47. The eighth water tank 48 has a bottom portion 48A which is connected to a bottom portion 47D of the seventh water tank 47 and is downwardly inclined toward the bottom portion 47D. Also, the bottom portion 47D of the seventh water tank 47 has the same inclination as that of the bottom portion 48A. The inclined bottom portions 47D and 48A serve to direct to the aeration tube 70 at the bottom matter which falls down toward the bottom portions 47D, 48A so as to cause such matter to flow upward by convection in air currents blown from the aeration tube 70.

The ninth water tank 49 is disposed adjacent to the eighth water tank 48 in spaced relation thereto. The ninth water tank 49 has an aeration tube 88 at the bottom thereof. The aeration tube 88 is connected to a fifth blower 90. The ninth water tank 49 has a membrane filter portion 91 in a top portion thereof. The membrane filter portion 91 has a plurality of laterally arranged ultrafilter membranes or precision filter membranes. In the present embodiment, ultrafilter membranes or precision filter membranes arranged under water are used; however, it is possible to employ other filter membranes, for example, reverse osmosis membranes. The plurality of ultrafilter membranes or precision membranes are mounted to two vertically opposed pipes. A membrane filter pump 92 is connected to the membrane filter portion 91 so that the pump 92 may be driven to introduce treated water passed through the membrane filter portion 91 into the eleventh water tank 51. An outlet portion 61D of the return air lift pump 61 is connected to a topmost portion of the ninth water tank 49. Regenerated cation exchange resin 93 is introduced through this outlet portion 61D into the ninth water tank 49.

The tenth water tank 50 is disposed adjacent to the ninth water tank 49 and in abutting relation thereto. The tenth water tank 50 has a bottom 50A which is sloped down in a direction away from the ninth water tank 49. An inlet end 95A of an introduction air lift pump 95 is fixed at a location adjacent to a lowermost portion of the bottom 50A. An aeration tube 96, as air introduction means, is disposed within the inlet end 95A. The aeration tube 96 is connected to the fifth blower 90. The introduction air lift pump 95 extends straightly upward from the inlet end 95A, the uppermost portion of the pump 95 defining an opening 95B. The introduction air lift pump 95 bends laterally at a site located a short way back from the opening 95B and extends therefrom in a somewhat downslope fashion toward the first water tank 41 to define a downslope portion 95C. The introduction air lift pump 95 bends downward at the end of the downslope portion 95C, then extending vertically downward to define a downward extension 95D. The downward extension 95D has a lower end outlet which is fixed to a topmost portion of the first water tank 41.

It is arranged that treated water introduced from the ninth water tank 49 into the eleventh water tank 51 is introduced by a treated water pump 98 into a primary pure water production unit 56. The treated water from the eleventh water tank 51 is subjected to ion exchange in the ion exchange resin unit 54 and is then introduced into a reverse osmosis membrane unit 55 for filtration. The treated water passed through the primary pure water production unit 56 may be recycled as primary pure water or, after being subjected to subsequent treatment by a secondary pure water production unit (not shown), as ultrapure water at the semiconductor plant.

In the water treating apparatus of the above described arrangement, acid waste water from the semiconductor plant is first introduced into the first water plant 41. At the same time, cation exchange resin 93 is introduced into the first water tank 41 through the introduction air lift pump 95. The cation exchange resin 93 is used cation exchange resin because it has been subjected to ion exchange with the treated water in the ninth water tank 49. Therefore, the cation exchange resin 93 contains calcium ions $Ca^{++}$ as positive ions. The cation exchange resin 93 introduced into the first water tank 41 reacts with the acid waste water under aeration by the aeration tube 57, with the result that calcium ions of the cation exchange resin 93 are liberated (Ca-cation exchange resin $+2H^+ \rightarrow Ca^{++} +2H$-cation exchange resin). Thus, the cation exchange resin is regenerated. Liberated calcium ions react efficiently with fluoric ions in the acid waste water to form calcium fluoride.

At a semiconductor plant, high quality fluoric acid and sulfuric acid of electronics industry grade are used in washing wafers, and the wafers are then washed with ultrapure water. Acid waste water resulting from such washing operation is discharged as acid waste water from the plant. Therefore, acid waste water from the semiconductor plant may be said to be comparatively clean waste water. Conventionally, hydrochloric acid and sulfuric acid as provided for regeneration of cation exchange resins are of industrial quality level. Therefore, acid waste water originating from fluoric acid and sulfuric acid of such quality level will function satisfactorily as chemicals for cation exchange resin regeneration.

The aeration tube 57 blows air to thoroughly agitate the acid waste water and the cation exchange resin 93 into mutual contact. Therefore, aforesaid calcium ions and fluoric ions of fluorine origin can be efficiently reacted therebetween.

Next, the water treated as described above, together with the regenerated cation exchange resin 93, flows into the neighboring second water tank 42. In the second water tank 42, at a vertically median location, the aeration tube 59 is aerating at a comparatively small rate of air blow. Within the second water tank 42, the cation exchange resin 93 precipitates because of its comparatively large specific gravity, whereas the calcium fluoride does not precipitate because of its fine particle size and reluctance to sedimentation. Therefore, the calcium fluoride is introduced into the neighboring third water tank 43 accompanying the treated water.

The cation exchange resin 93 moves downward along the inclined bottom 42A so that it is automatically allowed to reach the inlet end 61A of the return air lift pump 61. Then, the cation exchange resin 93 is sucked through the inlet end 61A and moves upward together with the air blown from the aeration tube 62. While the air is discharged from the open end 61B, the regenerated cation exchange resin 93 flows into the lateral portion 61C. The cation exchange resin 93 travels along the lateral portion 61C which is slightly downward inclined and is caused to descend at the end of the lateral portion 61C. The regenerated cation exchange resin 93 is then returned to the ninth water tank 49. In this way, through its reaction with the acid waste water in the first water tank 41, the cation exchange resin 93 acts to treat the acid waste water and, simultaneously therewith, regenerate itself. Further, the regenerated cation exchange resin 93, returned to the ninth water tank 49, acts to remove positive ions of the treated water. That is, according to this second embodiment, it is possible to simultaneously carry out the steps of regenerating the cation exchange resin 93 and treating the waste water with the cation exchange resin 93. Therefore, improved efficiency of waste water treatment can be achieved. Further, by using used ion exchange resin from the ion exchange resin unit 54 of the primary pure water production system 56, the used ion exchange resin can be effectively utilized for water treating purposes, without being discarded as waste. At the same time, this arrangement contributes to waste quantity reduction, which in turn results in reduction of costs involved in disposal of wastes.

According to this second embodiment, the cation exchange resin 93 is moved between tanks by means of the air lift pumps 61 and 69; therefore, the cation exchange resin 93 is prevented from being damaged during such movement. Further, each of the air lift pumps 61 and 95 is sloped downward in the direction of movement of the cation exchange resin 93, and this insures smooth flow of the cation exchange resin 93.

The treated water from the second water tank 42 flows into the third water tank 43. Unreacted fluoric ions react with calcium ions eluted from the calcium carbonate mineral packed in the third water tank 43 (first reaction tank) into bond to produce calcium fluoride. Furthermore, the presence of calcium carbonate provides for neutralization of sulfuric acid. The calcium carbonate mineral 65 is aerated by the air blown from the aeration tube 63 and accordingly the elution of calcium ions is accelerated. The treated water introduced from the second water tank 42 into the third water tank 43 is of acidic nature with a pH value of 4 or lower. Therefore, the calcium carbonate mineral 65 used as such is of comparatively large grain size on the order of 1 cm in diameter, and the quantity of air used for aeration is maintained at a reasonable level. With these measures taken, grains of the calcium carbonate mineral 65 are prevented from welding together when calcium ions are eluted. In this second embodiment, natural limestone is used as calcium carbonate mineral 65; however, ground calcium carbonate may be used as such, or a commercial mineral product known as "Kansuiseki" may be used.

The lattice plate 64 of the third water tank 43 is such that its vertical projected area is exceedingly smaller than its lateral projected area. Therefore, aerated air from the aeration tube 63 can readily pass through the lattice plate 64. The lattice plate 64 has comparatively large strength so that it can support the calcium carbonate mineral 65 which is of comparatively heavy weight.

The treated water from the third water tank 43 is next made to flow into the fourth water tank 44. In the fourth water tank 44 the treated water is subjected to solid-liquid separation and, as a result, separated calcium fluoride precipitates on the bottom portion 44A. The precipitated calcium fluoride is introduced into the concentration tank 52 via a pipe connected to the bottom 44. Meanwhile, a supernatant liquid in the fourth water tank 44 flows into the fifth water tank 45 (second reaction tank). In the fifth water tank 45, unreacted fluoric ions in the treated water react with calcium ions eluted from the calcium carbonate mineral 68 to produce calcium fluoride. The calcium carbonate mineral 68 in the fifth water tank 45 has a grain size of the order of 0.5 cm in diameter. This means that the fifth water tank 45 has higher reactivity than the third water tank 43 for generation of calcium fluoride. Therefore, the fifth water tank 45 is capable of further decreasing the fluoric ion concentration in the treated water.

The treated water whose fluoric ion concentration has thus been further lowered in the fifth water tank 45 is then caused to flow into the sixth water tank 46. In this sixth water tank 46, a precipitate deposits on the bottom 46A of funnel shape. The precipitate is introduced into the concentration tank 52 through a pipe connected to the bottom 46A. The precipitate, after it is concentrated in the concentration tank 52, is transferred to the next stage, i.e., filter press 53 by which the precipitate is dehydrated. At the filter press 53, a cake is produced which generally has a water content of not more than 65%, though the water content may vary depending upon the type of filter press employed.

A supernatant liquid in the sixth water tank 46 is caused to flow into the next stage tank or seventh water tank 47 for treatment therein. The seventh water tank 47 functions as a hydrogen peroxide decomposition tank. In the seventh water tank 47, the water to be treated is first agitated through aeration by the aeration tube 70 at the first contact circulation portion 47B-1 of the submerged lower portion 47B. Thus, the water goes in contact with the charcoal 76 and plastic fillers 75, and the hydrogen peroxide contained in the water is decomposed by the charcoal 76, while the organic matter contained in the water is decomposed by microorganisms grown on the plastic fillers 75.

Then, the water flows into the second contact circulation portion 47B-2, and reacts with the charcoal 80 and plastic fillers 78 therein while being allowed to contact with them, whereby the hydrogen peroxide in the water is decomposed. The hydrogen peroxide is decomposed into water and oxygen gas with the aid of the charcoal 80 which acts as a catalyst. The first contact circulation portion 47B-1 and second contact circulation portion 47B-2 are separated from each other by a partition wall W10.

Subsequently, the water so treated passes through the lattice plate 77, whereupon one part of the water is allowed to return to the first contact circulation portion 47B-1, while the other part of the water reaches the lower end opening 85A of the air lift pump 85. The treated water that has reached the opening 85A is moved upward together with the air blown from the aeration tube 86. The treated water which has reached the wetting upper portion 47A is sprinkled through a plurality of holes of the sprinkler 87 to wet the wetting upper portion 47A. The water descends by gravity while wetting the charcoal 83 and plastic filler 82 packed in the wetting upper portion 47A. In this case, the hydrogen peroxide contained in the treated water is decomposed through the intermediary of the charcoal 83 and more effectively by air-liquid contact due to water spray.

In this way, the water introduced into the seventh water tank 47 undergoes the process of hydrogen peroxide decomposition while circulating through the first contact circulation portion 47B-1, second contact circulation portion 47B-2, and wetting upper portion 47A. For the plastic fillers 75, 78, 82, selection may be made suitably from those including Raschig ring, Berl saddle, interlock saddle, Terralet and pole ring. These plastic fillers have multiple air and water permeable portions and facilitate water movement. Therefore, the treated water can be equally distributed throughout the wetting upper portion 47A in particular, from the top to the bottom thereof. This facilitates the decomposition of hydrogen peroxide through the catalyzing effect of the charcoal, as well as hydrogen peroxide decomposition through air-liquid contact. Although in this second embodiment the seventh water tank 47 is equipped with air lift pump 85, a pump in conventional use may be provided instead of the air lift pump 85. It is noted, however, that the use of the air lift pump 85 provides an advantage that it enables movement of the treated water in larger quantities at a lower power cost. Further, the use of the air lift pump 85 enables the water under treatment to be maintained in an aerobic condition, and this facilitates propagation of microorganisms. Therefore, in the wetting upper portion 47A in particular, the propagation of aerobic microorganisms is facilitated, and organic matter in the water under treatment can be efficiently treated by such microorganisms.

In the seventh water tank 47, hydrogen peroxide in the water under treatment is treated at the first contact circulation portion 47B-1 and second contact circulation portion 47B-2 of the lower tank section and, therefore, it is more likely that microorganisms will grow on the charcoal 83 at the wetting upper portion 47A. Where the hydrogen peroxide concentration of the waste water (water under treatment) is low, hydrogen peroxide metabolization bacteria propagate in course of time not only in the wetting upper portion 47A, but also on charcoal 76, 80 packed in the first and second contact circulation portions 47B-1, 47B-2, to treat organic matter. The term "hydrogen peroxide metabolization bacteria" herein means microorganisms familiarized with hydrogen peroxide of low concentration. Charcoal 76, 80 serve as carriers for immobilizing microorganisms and the surface of the charcoal will be formed with biofilms. Therefore, in case that the first contact circulation portion 47B-1 is loaded with a surplus sludge or biofilm sludge produced at a separate biological treatment site, biofilms can be quickly formed on the charcoal 76, 80 which act as microorganism immobilizing carriers. Also, by introducing biofilm sludge periodically into the first contact circulation portion 47B-1, it is possible to enable target biofilms to be constantly provided. Organic matter in the water under treatment is treated by microorganisms grown on the surface of charcoal 83 in the wetting upper portion 47A, those grown on the surface of charcoal 76 in the first contact circulation portion 47B-1, and those grown on the surface of charcoal 80 in the second contact circulation portion 47B-2.

For the charcoal 76, 80 loaded in the first contact circulation portion 47B-1 and second contact circulation portion 47B-2, a charcoal known as "Binchotan" charcoal is selected which has a specific gravity of greater than 1 so that the charcoal submerges in water. The "Binchotan" charcoal acts to adsorb organic substances. Therefore, organic matter adsorbed by "Binchotan" charcoal, i.e., charcoal 76, 80, is treated by microorganisms grown within charcoal 76, 80. The charcoal 76, 80 on which microorganisms are propagated may generally be called activated charcoal.

Next, the water under treatment is allowed to flow from the seventh water tank 47 into the eighth water tank 48, and a supernatant liquid of the treated water therein is introduced into the next stage tank or the ninth water tank 49. The ninth water tank 49 is a cation exchange resin aeration tank to which cation exchange resin 93 regenerated by acid waste water in the first water tank 41 is continuously returned through the air lift pump 61. In this ninth water tank 49, the water is subjected to agitation and aeration by the aeration tube 88. Calcium ions contained in the treated water which are derived from calcium carbonate mineral are removed by the action of cation exchange resin 93 on an ion exchange basis. The air blown from the aeration tube 88 not only clean the membrane filter portion 91, but facilitates replacement of calcium ions in the waste water with cation exchange resin.

The water removed of calcium ions is sucked by the pump 92 to pass through the membrane filter portion 91. The membrane filter 91 is operative to filter out cation exchange resin 93 from the water and also filter out fine suspended microorganisms and reaction products (e.g., fine calcium fluoride particles) which did not precipitate in the eighth water tank (sedimentation tank) 48. It is noted that such suspended microorganisms will become digested and die out in course of time because they were aerated in the ninth water tank 49.

In the current state of the art, ultrafilter membranes and precision filter membranes are the only types of commercial products which are available for use as submerged filters (membrane filters) to be set in a tank, and there is no other type known for use as such. In case that a reverse osmosis membrane is employed as a membrane filter, it is necessary that the reverse osmosis membrane itself be set outside the ninth water tank 49 or a cation exchange resin aeration tank, and not within the tank. At present, no reverse osmosis membrane is known which is of the submerged type for placement within the tank. One specific example of ultrafilter membrane of the submerged type for placement within the tank is "NF series" of Kubota Corporation. One specific example of precision filter membrane is "STERAPORE" of Mitsubishi Rayon Co., Ltd. Needless to say, the present invention is not limited by these specific examples. For the reverse osmosis membrane, it is only necessary that a cellulose acetate membrane of the spiral type be selected which has an operating pressure of 10–25 kg/cm$^2$, there being no limitation whatsoever in respect of manufacturer and product type or model. Of the foregoing three types of separation membranes, reverse osmosis membrane provides highest precision of filtration. Then, ultrafilter membrane comes second and precision filter membrane comes third in filtration precision. The reverse osmosis membrane is capable of filtering ions of low molecular range, whereas either ultrafilter membrane or precision filter membrane are incapable of filtering ions of low molecular range. The ultrafilter membrane can remove all kinds of fine particles, bacteria, and virus and some of dissolved organic substances of colloidal phase. The precision filter membrane can remove some of fine particles, bacteria, and virus, and some of dissolved organic substances of colloidal phase.

In the present embodiment, the membrane filter portion 91 is comprised of ultrafilter membranes. Alternatively, the membrane filter portion 91 may be comprised of precision filter membranes or may be comprised of reverse osmosis membranes. As another alternative, the membrane filter portion 91 may be comprised of ultrafilter membranes and reverse osmosis membranes in combination. It is needless to say that such a combination is contributive to quality improvement of treated water.

In the ninth water tank 49, the membrane filter portion 91 is constantly cleaned by aeration air from the aeration tube 88, and this prevents filter clogging and will minimize possible decrease in the volume of treated water due to such clogging. Where it is anticipated that treatment of the water would involve clogging at the membrane filter portion 91, the membrane filter pump 92 may be operated on an on-off control basis so that filtration at the membrane filter portion 91 is intermittently carried out. By this intermittent operation it is possible to minimize possible clogging and thus to minimize possible decrease in the quantity of filtered water.

As FIG. 2 shows, the membrane filter portion 91 includes a plurality of ultrafilter membranes arranged in laterally spaced relation between a pair of vertically spaced pipes (or plates). It is noted that if the membrane filter portion 91 has a "STERAPORE" unit, as precision filter membranes, instead of the ultrafilter membranes, the "STERAPORE" unit is a precision hollow-thread membrane filter and is therefore of thread form, not of plate form. In that case, therefore, the membrane filter portion includes a plurality of threads arranged in spaced relation.

For the membrane filter portion 91, as already stated, precision filter membrane or reverse osmosis membrane may be used instead of the ultrafilter membrane. In that case, selection of either type of membrane may be determined according to a final target water quality for the primary pure water production apparatus 56 within the overall water treatment system. In the overall system, it is particularly important from the standpoint of maintenance that the surface of the membrane filter portion 91 be always kept clean by air.

Treated water pumped up by the membrane filter pump 92 is introduced into the eleventh water tank 51 which constitutes a pump pit.

The cation exchange resin 93 which has exchanged hydrogen ions with calcium ions is allowed to the next stage tank or tenth water tank 50 in which the resin 93 moves downward along the downwardly sloped bottom 50A. The cation exchange resin 93 is then sucked through the inlet end 95A of the air lift pump 95 for movement upward together with the air introduced from the aeration tube 96. Then, the cation exchange resin 93 passes through the downslope portion 95C and downward extension 95D smoothly without being damaged and is then introduced into the first water tank 41. In the first water tank 41 which functions as a cation exchange resin regenerating aeration tank, the cation exchange resin 93 is regenerated by acid waste water for repetitive use.

The treated water introduced into the eleventh water tank 51 which functions as a pump pit is pumped up by the treated water pump 98 for being introduced into the ion exchange resin unit 54 which is loaded with anion exchange resin or the like. In the ion exchange resin unit 54, the treated water is further subjected to ion exchange treatment. The treated water which has thus passed through the process of cation and anion treatment is then introduced into the reverse osmosis membrane unit 55 for treatment therein. Depending upon the final quality required of ultrapure water, the treated water as discharged from the reverse osmosis membrane unit 55 is passed through a further series of treating units not shown for further treatment until it is finally produced into ultrapure water.

Third Embodiment

Figure 3:
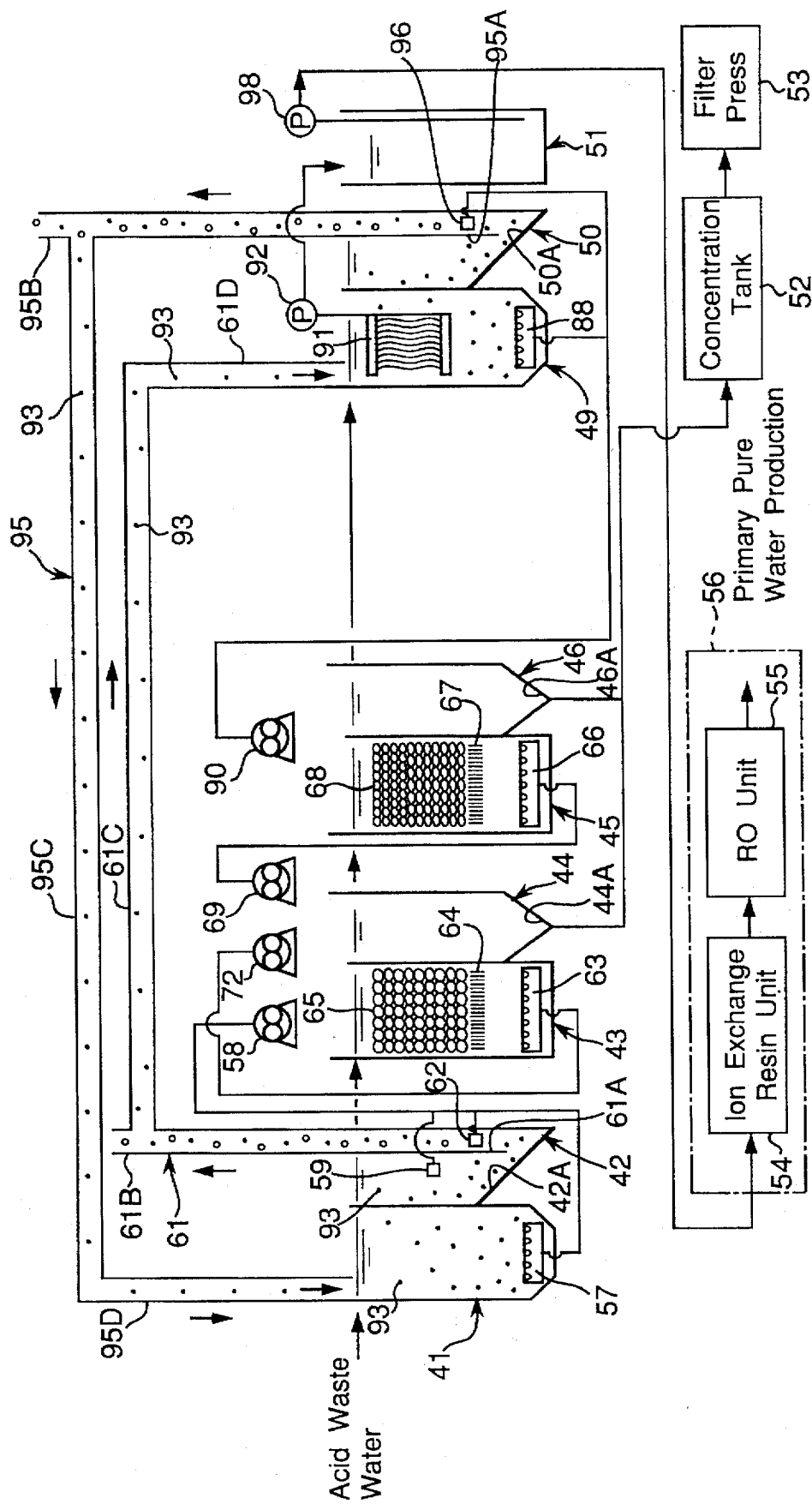
FIG. 3 is a diagram showing a third embodiment of a water treating apparatus according to the invention.

FIG. 3 shows a third embodiment of the water treating apparatus according to the invention. The third embodiment differs from the second embodiment only in that the third embodiment apparatus does not include the seventh water tank (hydrogen peroxide decomposition tank) 47, eighth water tank (precipitation tank) 48, and fourth blower 71 which are shown in FIG. 2. In FIG. 3, therefore, components identical with those shown in FIG. 2 are designated by the same numerals as those given in FIG. 2.

In this third embodiment, treated water from the sixth water tank 46 flows directly into the ninth water tank 49. The third embodiment is employed in case where absolutely no hydrogen peroxide concentration is detected from the acid waste water from the plant, or where even if hydrogen peroxide water is detected, such hydrogen peroxide content is only negligible so that hydrogen peroxide-containing water need not be treated.

Generally, at semiconductor plants, waste water that contains hydrogen peroxide can be independently separated from the piping of the production system of the plant. Therefore, at some semiconductor plants, only hydrogen peroxide water is separately treated without hydrogen peroxide being mixed into acid waste water. The waste water treating apparatus of the third embodiment is suitable for use at such a semiconductor plant.

According to the waste water treating arrangement of the third embodiment, therefore, in the case where the acid waste water contains no hydrogen peroxide, such highly treated water as may be recycled as raw water for the primary pure water production unit 56 can be obtained from the acid waste water without employing a bioreactor (the seventh water tank) having upper and lower portions which are packed with charcoal and plastic fillers as in the second embodiment.

It is to be noted, however, that the third embodiment shown in FIG. 3 is not suitable for use in treating waste water that contains hydrogen peroxide and/or organic matter. As already stated, charcoal is not used in the third embodiment at all; therefore, the performance of the third embodiment is not only lower than that of the second embodiment in the treatment of amounts of hydrogen peroxide, but also lower in the treatment of organic matter.

EXAMPLE

A specific example is given for further illustration. In the water treating apparatus of the second embodiment shown in FIG. 2, component units were arranged to have the following capacities respectively. The first water tank (cation exchange resin regenerating aeration tank) 41 had a capacity of about 0.6 cubic meter. The second water tank (first precipitation tank for regenerated cation exchange resin) 42 had a capacity of about 0.3 cubic meter. The third water tank (first reaction tank) 43 had a capacity of about 1.2 cubic meter. The fourth water tank (second precipitation tank) 44 had a capacity of about 0.4 cubic meter. The fifth water tank (second reaction tank) 45 had a capacity of about 1.2 cubic meter. The sixth water tank (third precipitation tank) 46 had a capacity of about 0.4 cubic meter. The first contact circulation portion 47B-1 had a capacity of about 0.6 cubic meter. The second contact circulation portion 47B-2 had a capacity of about 0.4 cubic meter. The wetting upper portion (reaction sprinkling portion) 47A had a capacity of about 0.5 cubic meter. The eighth water tank (fourth precipitation tank) 48 had a capacity of about 0.2 cubic meter. The ninth water tank (cation exchange resin aeration tank) 49 had a capacity of about 0.6 cubic meter. The tenth water tank (fifth precipitation tank) 50 had a capacity of about 0.4 cubic meter. The quantity of cation exchange resin (ion exchange resin) 93 was set at about 10% of the sum of the capacities of the first and second water tanks 41, 42 and the capacities of the ninth and tenth water tanks 49, 50. The quantity of transfer by air lift pumps 61 and 95 was set at about 3% of the throughput of waste water.

The 3% portion of the waste water throughput which represents the quantity of transfer from the second water tank 42 to the ninth water tank 49 is defined to be a proportion which does not pass through the waste water treating tanks between the second water tank and the ninth water tank and thus remains untreated, whereas 97% of the throughput is treated in aforesaid treating tanks. Therefore, the waste water as a whole may be taken as having substantially been treated.

In the present example, the subject acid waste water, in its untreated stage, had: a pH level of 2.9; a fluorine concentration of 206 ppm; an electric conductivity of 1600 μs/cm; a cation total concentration of 64 ppm; a hydrogen peroxide concentration of 112 ppm; TOC (Total Organic Carbon) of 12 ppm, and a $KMnO_4$ consumption of 110 ppm. After treatment, the pH level of the waste water was improved to 7.2, the fluorine concentration was reduced to 13 ppm, and the electric conductivity was lowered to 320 μs/cm. The cation total concentration was reduced to 40 ppm, and the hydrogen peroxide concentration was decreased to not more than 6 ppm. The TOC was reduced to not more than 1 ppm, and the $KMnO_4$ consumption was lowered to not more than 6 ppm. The $KMnO_4$ consumption is one of analysis items as needed in connection with pure water production such that it is mainly used to indicate the quantity of organic matter.

Figure 4:
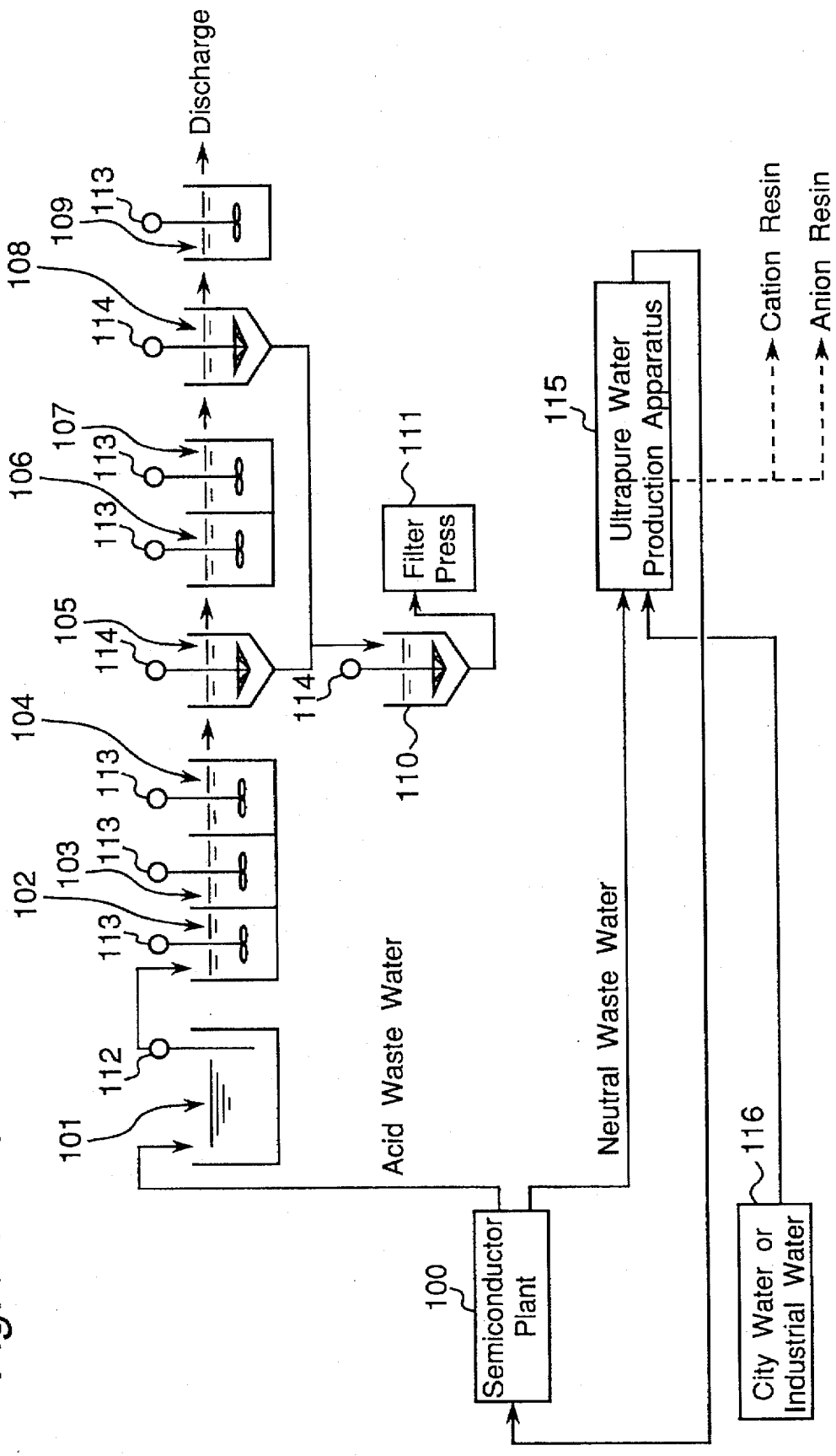
FIG. 4 is a diagram showing the arrangement of a conventional acid waste water treating apparatus.
Figure 5:
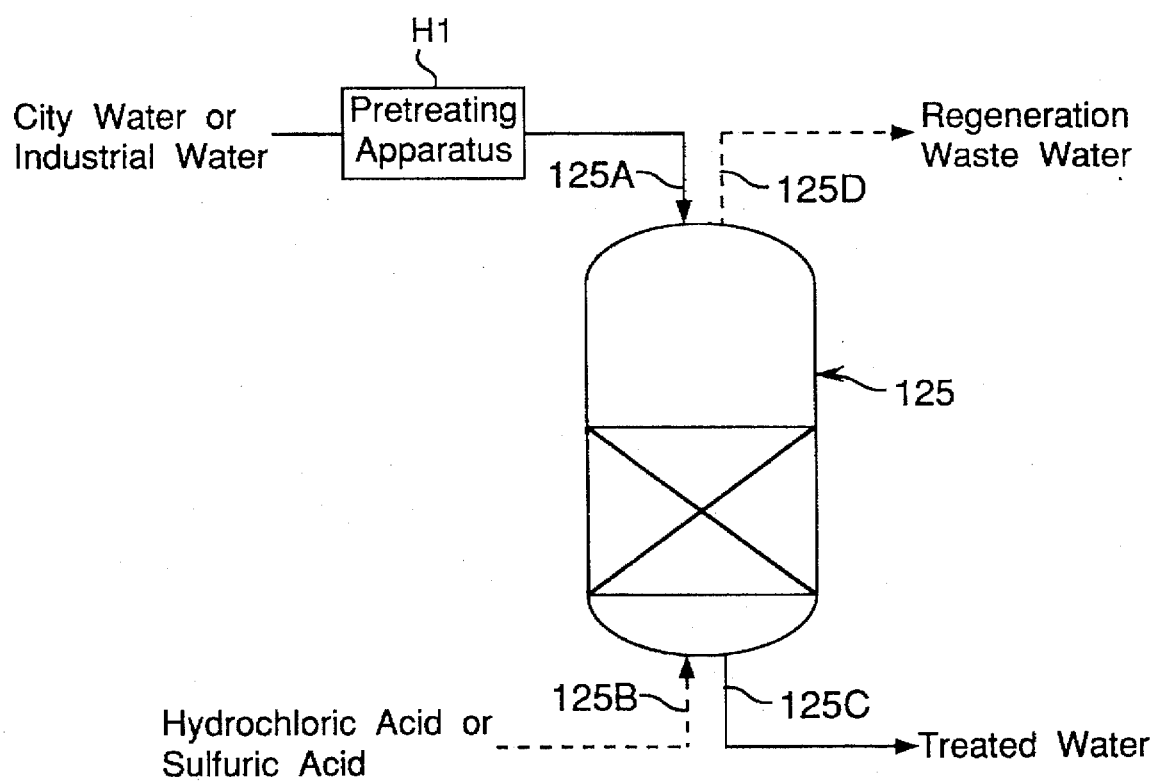
FIG. 5 is a schematic diagram showing a conventional cation resin tower.

For purposes of comparison, acid waste water of the same quality as above described in its untreated condition was treated in the prior art acid waste water treating apparatus shown in FIG. 4. After treatment, the waste water had a pH level of 7.5, a fluorine concentration of 14 ppm, and an electric conductivity of 1780 μs/cm. Also, the waste water showed a cation total of 820 ppm, a hydrogen peroxide concentration of 62 ppm, TOC of 9 ppm, and $KMnO_4$ consumption of 82 ppm.

As compared with the prior art, the present example of the invention showed a conspicuous decrease in cation concentration to as low a level as about one twentieth. The hydrogen peroxide concentration was reduced to about one tenth of the prior art level. TOC value was reduced to one ninth or less of the prior art level. The $KMnO_4$ consumption was reduced to one thirteenth or lower of the prior art level. That is, the present example tells that the apparatus of the invention makes it possible to obtain highly treated water that is well qualified for supply to ultrapure water production equipment.

In the foregoing mode for carrying out the present invention, calcium carbonate is used in treating waste water. Alternatively, slaked lime may be used for treating the waste water. In this case, however, a coagulant is used for precipitation purposes; so any coagulant which has been ionized cannot be removed by the membrane filter and tends to adhere to the ion exchange resin. Therefore, ion exchange effect of the ion exchange resin cannot be expected.

In the foregoing second and third embodiments, cation exchange resin is used; however, for purposes of treating alkali waste water, such as ammonia water, anion exchange resin be used. In this case, the third water tank 43 through the sixth water tank 46 should be used as alkali treating tanks.

As above described, according to the present invention, a water treating apparatus and method which can meet the needs for resource conservation and energy saving as eagerly called for the protection of global environment, and which is friendly to the environment and rational to the cause of plant management.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water treating apparatus comprising:

a first water tank for receiving alkali water or acid water;

an ion exchange tank having anion exchange resin or cation exchange resin into which anionic water or cationic water is introduced such that the anionic water or cationic water is subjected to an ion exchange treatment with the anion exchange resin or cation exchange resin for generation of treated water;

an ion exchange resin introduction means for introducing into the first water tank the anion exchange resin or cation exchange resin in the ion exchange tank;

an ion exchange resin return means for returning to the ion exchange tank the anion exchange resin or cation exchange resin regenerated by alkali water or acid water in the first water tank; and means for receiving alkali water or acid water from the first water tank in which the anion exchange resin or cation exchange resin has been regenerated and for introducing into the ion exchange tank water to be treated which is the alkali water or acid water having been subjected to a predetermined treatment.

2. A water treating apparatus as set forth in claim 1, wherein the first water tank receives alkali waste water or acid waste water as alkali water or acid water.

3. A water treating apparatus as set forth in claim 1, further comprising aeration means for mixing the alkali water or acid water with anion exchange resin or cation exchange resin in the first water tank.

4. A water treating apparatus as set forth in claim 1, further comprising aeration means for mixing the anionic water or cationic water with anion exchange resin or cation exchange resin in the ion exchange tank.

5. A water treating apparatus as set forth in claim 1, wherein the ion exchange resin introduction means and the ion exchange resin return means each comprise piping interconnecting the first water tank and the ion exchange tank and an air lift pump.

6. A water treating apparatus as set forth in claim 1, wherein the ion exchange tank includes a membrane filter placed therein and further comprising a treated water discharge means for discharging a treated water from which the anion exchange resin or cation exchange resin has been separated through the membrane filter.

7. A water treating apparatus as set forth in claim 1, wherein the means for introducing into the ion exchange tank the water to be treated which has been subjected to the predetermined treatment include a calcium carbonate mineral tank having a calcium carbonate mineral placed therein which receives from the first water tank an acid waste water having regenerated the cation exchange resin in the first water tank and which discharges a liquid resulting from the calcium carbonate mineral dissolved in the acid waste water to have a liquid level close to neutrality.

8. A water treating apparatus as set forth in claim 7, wherein the means for introducing into the ion exchange tank the water to be treated which has been subjected to the predetermined treatment include a biological treating tank for receiving the liquid brought close to neutrality from the calcium carbonate mineral tank, said biological treating tank having charcoal and plastic filler placed therein by which the liquid is circulated for biological treatment, and for discharging biologically treated liquid as cationic water to the ion exchange tank.

* * * * *